3 Sheets—Sheet 1.

F. G. SARGENT.
Waste Picker.

No. 239,065.       Patented March 22, 1881.

Witnesses
Wm. S. Brown
N. P. Ockington

Inventor
F. G. Sargent
by Lepine & Price
his Attorney

3 Sheets—Sheet 3.

F. G. SARGENT.
Waste Picker.

No. 239,065. Patented March 22, 1881.

Witnesses

Inventor

UNITED STATES PATENT OFFICE.

FREDERICK G. SARGENT, OF GRANITEVILLE, MASSACHUSETTS.

WASTE-PICKER.

SPECIFICATION forming part of Letters Patent No. 239,065, dated March 22, 1881.

Application filed January 22, 1880.

*To all whom it may concern:*

Be it known that I, FREDERICK G. SARGENT, of Graniteville, county of Middlesex, and State of Massachusetts, have invented a new and useful Improvement in Waste-Pickers, of which the following is a specification.

My invention relates to improvements in machines for picking or carding waste or fibrous materials; and the object of my improvement is to provide a machine which shall more thoroughly disentangle and comb out the fibrous material and operate more rapidly and thoroughly than machines heretofore constructed. I attain these objects by the mechanism illustrated in the accompanying drawings, in which—

Figure 1:
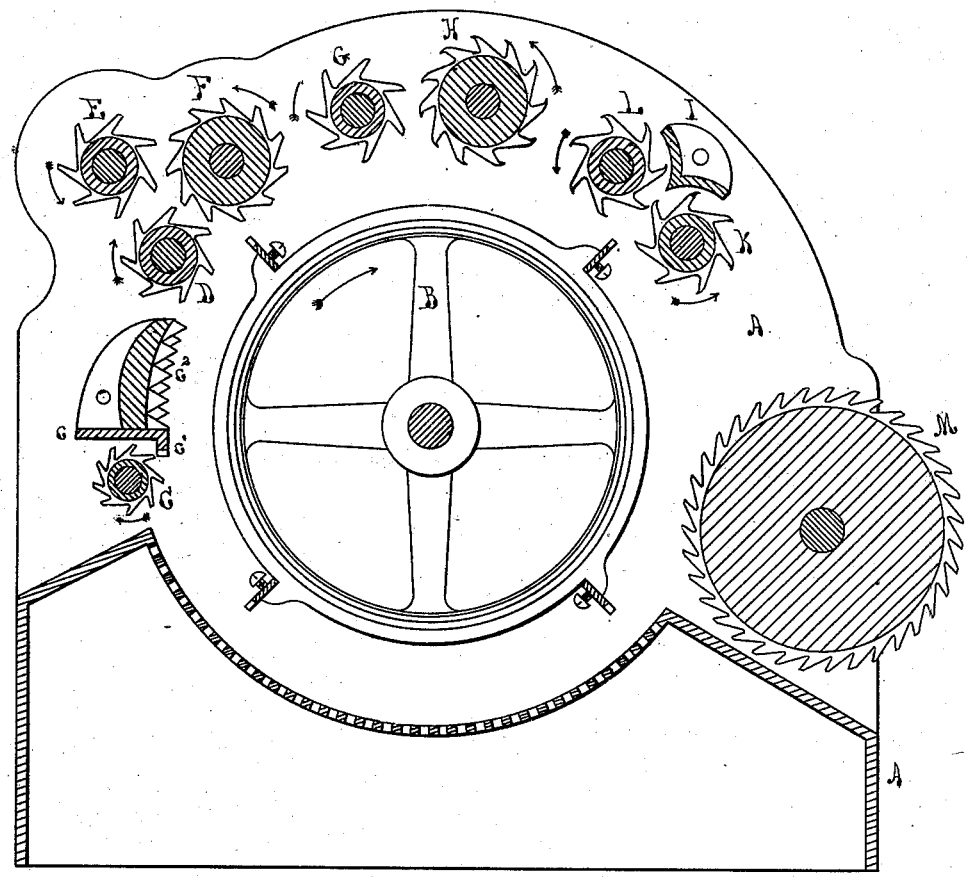
Figure 2:
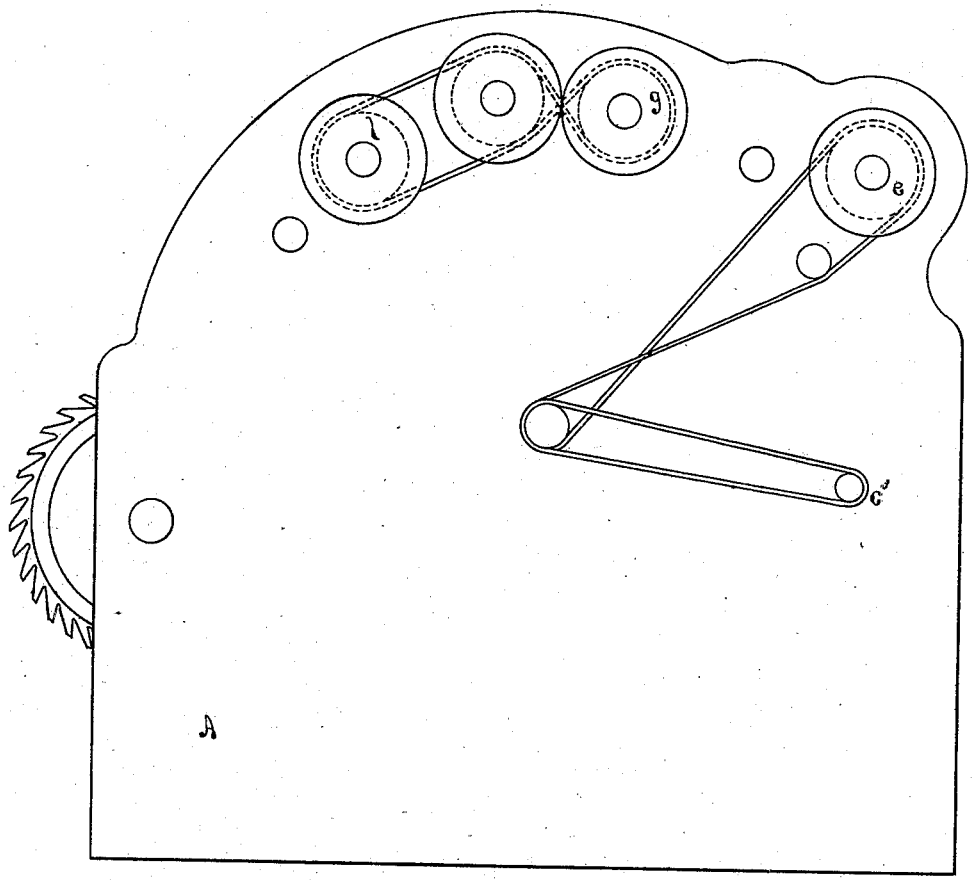
Figure 3:
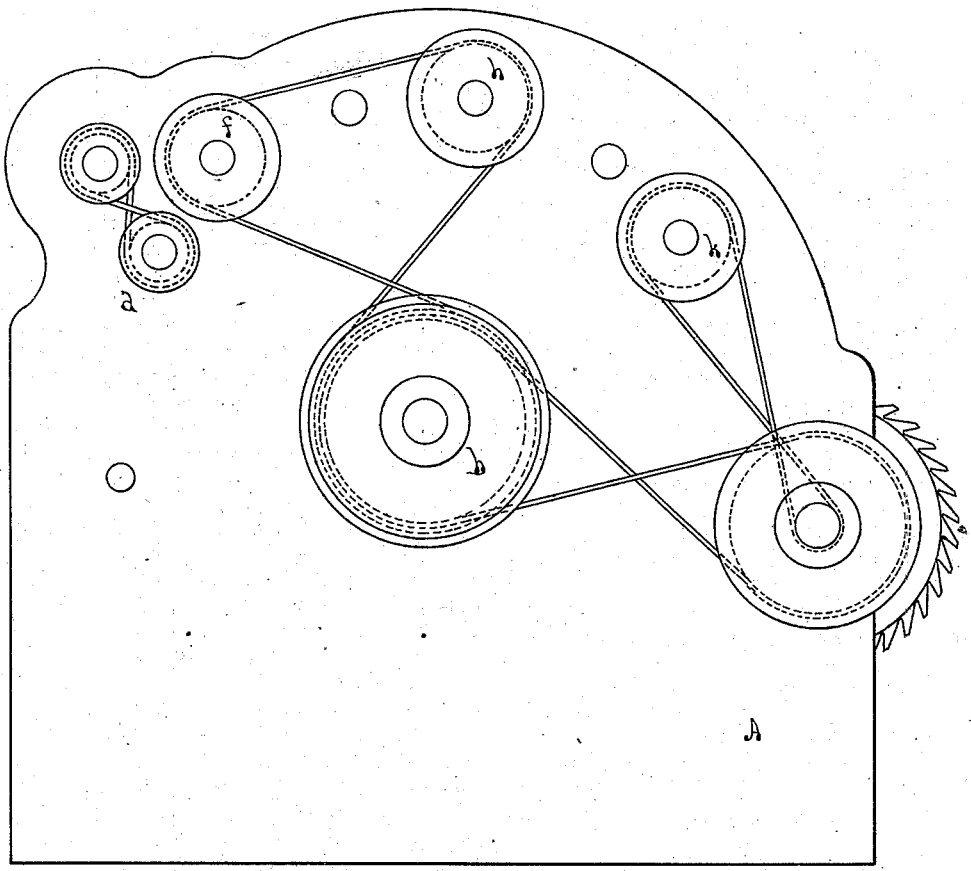

Figure 1 is a vertical section of the machine; Fig. 2, an elevation of one end of the machine, showing how some of the parts are driven; Fig. 3, an elevation of the other end of the machine, showing the manner of driving the several parts not shown in Fig. 2.

Similar letters refer to similar parts throughout the several views.

A is the frame in which the boxes for the bearings of the shafts of the various picking, working, and feed cylinders are placed.

B is the main cylinder, having teeth, combs, or card-clothing upon its periphery. This cylinder is driven by a belt working upon the pulley $b$.

C is the feed cylinder or roller, against which the yarn-waste or other material to be operated upon is placed. By means of the teeth upon it the stock is fed in between the roller and the guard-plate $c$, which has a serrated edge, $c'$, next the cylinder B, and extends upward concentric with the cylinder in a surface which is provided with pins or teeth $c^2$. C is driven by the pulley $c^3$.

D is a working-cylinder, having teeth tangential in the direction of its direction of rotation, which is the same as that of the cylinder B. This cylinder moves comparatively slow, and is placed close to the cylinder B, and is driven by the pulley $d$. Above and outside of this cylinder is stripper-cylinder E, of the same diameter and moving at the same rate in the opposite direction, but having its tangential teeth inclined backward to its direction of rotation, being driven by pulley $e$. Back of these cylinders, revolving with its toothed periphery close to the peripheries of the cylinders B, D, and E, is another cylinder, F, whose tangentially-toothed periphery moves in the same direction of rotation as the cylinder E, but with greater rapidity and with less surface speed than the periphery of the cylinder B. This cylinder is driven by the pulley $f$. Farther onward, near the path of the cylinder B, is placed the cylinder G, driven by the pulley $g$, revolving and having its teeth placed similar to cylinder D. Placed with its periphery close to those of B and G is another cylinder, H, driven by the pulley $h$, running in the same direction and having its teeth placed like those of cylinder F, but having a somewhat greater surface-speed near the path of the cylinder B. Farther onward is another cylinder, L, whose direction of rotation and inclination of tangential teeth are the same as cylinder F, and working with it is another cylinder, K, with its direction of rotation the same and inclination of teeth in an opposite direction to cylinder L. These cylinders are driven by the pulleys $l$ and $k$, respectively. Outside of these two last-described cylinders is placed a shell, I, which has two hollows in it, one of which is concentric with one cylinder and the other with the other cylinder, and at the point of junction an edge is formed, against which the material taken by the cylinder K is delayed while the cylinder L combs it out.

M is the doffer which takes the fiber from the cylinder B, after which, by means of a doffer-comb, as is usual in such machines, it is removed.

The operation of this machine is as follows: The waste yarn or other fibrous material to be operated upon, being fed to the cylinder C, is carried between it and the guard-plate $c$ by the rotation of the cylinder C. As it passes in toward the cylinder B the teeth or combs on that cylinder, moving at a much greater speed than the surface of the feed-cylinder, comb out the fibers and carry them toward the cylinder D. To prevent too large pieces or quantities from passing in at once, the edge of the plate $c$ is serrated and the inner edge above has pins or teeth $c^2$, to catch and delay the larger fragments. The cylinder D, being placed close to the cylinder B, and having its teeth arranged for the purpose described, takes the fibers or fragments off from it, and the teeth or beaters of the cylinder B, passing forward, pull out and disentangle the fibers as they are carried backward and upward by the cylinder D, which, carrying them between itself and the cylinder E, which revolves at the same speed, presents them to the action of the teeth upon the cylinder F, which, revolving faster than the cylinders D and E, combs out the fibers as they are fed to it and held by the cylinders E D, which, by reason of the direction of their teeth, have a certain determined hold and feed. As the wool or fiber is fed forward and combed out it is taken from the grasp of the cylinders D and E by the cylinder F, from which it is again taken by the teeth upon the cylinder B, which, as it revolves with a greater surface-speed than the cylinder F, will still further straighten out and disentangle the wool as it is carried forward to the cylinder G, whose periphery is provided with tangential teeth placed as are those of cylinder D. Upon these teeth the fibers are left by the cylinder B as they are combed and acted upon by the teeth on the cylinder B, and, being carried upward and over upon the cylinder G, pass down between it and the cylinder H, which acts, in conjunction with the cylinder G, as a feed-roll to hold the fibers while they are combed and straightened by the cylinder B as it passes beneath. As the teeth upon the cylinder G pass near the teeth of the cylinder H, any large bunches which may have escaped the grasp of the cylinder D and not have been operated upon by the cylinder F will be held as in feed-rolls, and more thoroughly operated upon than by a working-cylinder, which does not operate in conjunction with the clearing-cylinder as a feed-roll, and which, having taken the fiber from the main cylinder, performs no further function. Especially is this true in those machines designed to work waste or rework material which has been operated upon previously by other machinery and comes in this machine in a twisted or tangled condition. As the fiber is delivered by these cylinders it is carried by the cylinder B to the cylinder K, upon which it is taken and carried up toward the cap or shell I, and as it is so taken any tangled mass or fibers which may have passed the preceding cylinders is seized by the teeth upon the cylinder L and acted upon, and, if not thoroughly disentangled and combed out, it will follow around upon the cylinder L, and, being again taken by the cylinder K, it will be operated upon and be somewhat straightened by the action of its rapidly-moving teeth, and if lying across the cylinder or not perfectly disentangled it will be again taken and operated upon by the cylinders K and L in conjunction with the cap or shell I. The shell I serves the purpose of holding short stock close against the cylinder, and makes the action of the cylinder L much more effective than it would be without the shell, because, instead of lifting the fibers off from the back of cylinder K without drawing and straightening them, the cylinder L draws them continually across the edge of the shell which projects between the cylinders. Finally, as the fibers are perfectly combed out they will pass away from the cylinder K upon the cylinder B, from which they will be taken by the doffer.

What I claim as new and of my invention is—

1. The combination of the cylinder B with the cylinders D, E, F, G, H, K, and L and shell I, arranged as described, so that the cylinder D will take the fiber being acted upon from the cylinder B and, in conjunction with the cylinder E, feed it to the cylinder F, which, in turn, delivers it to the cylinder B, which takes it to the cylinder G, which, in conjunction with the cylinder H, acts as a feed-roll to feed the fiber to the cylinder B, which takes it to the cylinder K, by which it is taken up and acted upon by the cylinder L operating against the shell I, substantially as described.

2. The combination of the cylinder B with the cylinders D, E, and F, in the manner described, so that the fiber will be taken by the cylinder D from B and fed by the cylinders D and E to the cylinder F, which, after combing and straightening it out, will deposit it upon the cylinder B, substantially as described.

3. The combination of the cylinder B with the cylinders K and L and the shell I, the cylinder K being provided with backwardly-inclined teeth, which take the fibers lying upon the cylinder B and, carrying them under the shell I, permit the cylinder L to strip them off from it while combing them out over the interprojecting edge of the shell and reworking them, while the cylinder L is provided with forward-projecting teeth, which will strip the cylinder K and comb out the fibers taken from it over the edge of the shell, and then deposit them upon the cylinder B, substantially as described.

FREDERICK G. SARGENT.

Witnesses:
ALLAN C. SARGENT,
N. P. OCKINGTON.